Aug. 24, 1965 S. V. FORGUE 3,202,759

IMAGE PICKUP SYSTEM

Filed Nov. 16, 1961

INVENTOR.
STANLEY V. FORGUE

BY L. A. Larsen

Attorney 3,202,759

IMAGE PICKUP SYSTEM

Stanley V. Forgue, Cranbury, N.J., assignor to Radio Corporation of America, a corporation of Delaware Filed Nov. 16, 1961, Ser. No. 153,779
13 Claims. (Cl. 178—7.2)

This invention relates to an imaging system. In particular, this invention relates to an imaging system of the type that is adapted to detect and convert a selected wavelength of radiant energy into electrical output signals.

In the prior art there are many pickup or camera tubes which are designed to detect and produce electrical output signals of broad wavelengths of radiant energy. Many of these devices are useful for detecting various wavelengths of radiant energy, but include no means for selecting a particular band of wavelengths or for eliminating any non-selected wavelengths.

Although the invention is applicable to any desired selected wavelength of radiant energy, for example, infrared, ultra-violet or other selected wavelengths, or bands of wavelengths, it will be described with particular reference to an infrared imaging system. Thus, in the prior art, there are pickup tubes which are sensitive to the infrared. However, these pickup tubes are also sensitive to many of the wavelengths of the visible light spectrum. Therefore, if one attempts to utilize these pickup tubes to reproduce a signal from an infrared image, one must detect variations of signal, which are usually of a relatively small amount, from a very high background signal or noise.

There are other devices of the prior art which are specifically designed to detect a single band of radiant energy. However, these devices normally are of a negative modulation scheme in which the signal output is a lack of information. Normally, in these devices, the output signal is a slightly reduced signal from a very high background signal. Thus in these devices, the amount of signal must be relatively high to assure proper detection.

It is therefore an object of this invention to provide a new and improved imaging device or system.

It is a further object of this invention to provide a novel imaging device or system characterized in its ability to efficiently detect a selected wavelength or selected band of wavelengths of radiant energy.

These and other objects are accomplished in accordance with this invention by providing an imaging device wherein light from a scene to be reproduced is passed through a first filter and energy passing through the first filter is directed onto a second filter which is characterized by being of the positive modulation type. The positive modulation filter is made transparent to the energy being passed through the first filter, in each elemental unit, by being scanned by an electron beam; the energy of the selected band passes through both filters only in the elemental areas where the beam is being scanned, and is detected by a photosensitive device. The output signals from the photosensitive device are synchronized with the position of the electron beam so that an image type output signal is obtained.

The invention will be more clearly understood by reference to the accompanying single sheet of drawings wherein.

Figures 1, 2:
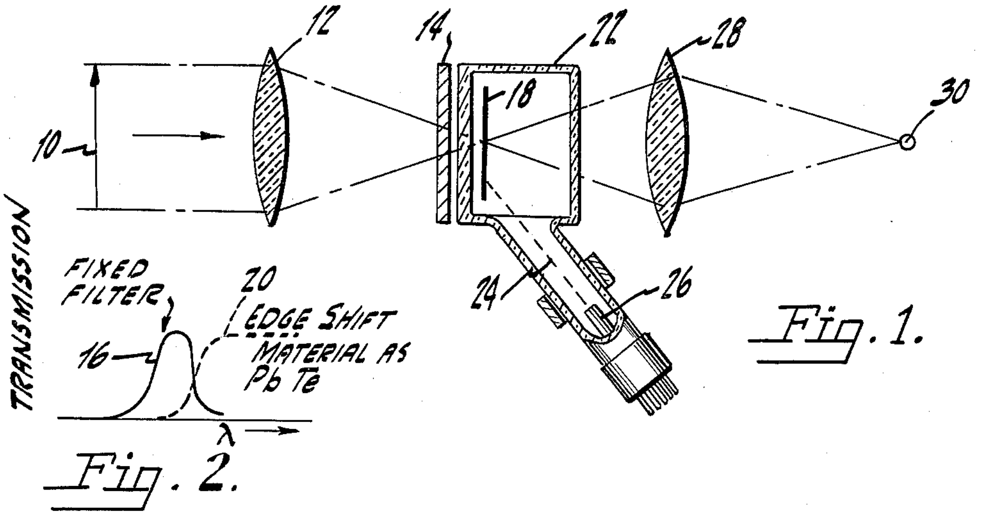
FIG. 1 is a partially schematic sectional view of an embodiment of this invention.
FIG. 2 is a characteristic curve of the wavelengths passed by the device illustrated in FIG. 1.

Referring now to the drawings in detail, there is shown an imaging device in FIG. 1 for detecting a particular wavelength of radiant energy. The device will be explained as detecting selected wavelengths of infra-red radiant energy. However, it should be understood that the device is equally applicable to the detection of other selected wavelengths or bands of wavelengths of radiant energy.

In FIG. 1, there is shown an infra-red scene represented by arrow 10 and which is to be detected. The infra-red scene is focussed onto any suitable infra-red transmitting lens system, such as, for example, silicon or $As_2S_3$, represented by lens 12. The radiation focussed by the lens 12 is directed onto a fixed filter 14 which passes selected wavelengths of radiant energy. The transmission or pass band curve of the fixed filter 14 is illustrated by a curve 16 in FIG. 2.

Any radiation which passes through the fixed filter 14 is focussed onto a second filter 18. The second or variable filter 18 is a filter having a variable transmission or pass band curve. The variable filter 18 is selected for its ability to pass radiation of a longer wavelength than that which is passed by the fixed filter 14. Also, the variable filter 18 is selected for its ability of shifting the radiation band passed to shorter wavelengths, which overlap substantially the band of wavelengths passed by the first filter 14, when the second or variable filter 18 is heated. In other words, the variable filter 18 is of the positive modulation type whose band gap increases with temperature.

Thus, the fixed filter 14 is selected so that it has a transmission curve which has a sharp cut-off just short of the absorption edge of the variable filter 18 when the variable filter 18 is in its unexcited condition. The transmission curve of the variable filter 18 is illustrated by curve 20 in FIG. 2.

The variable filter 18 is positioned within an envelope 22 so that it may be heated, in each elemental area, by being scanned by an electron beam 24 from a conventional electron gun 26. When the electron beam 24 scans the variable filter 18, the absorption edge of the variable filter 18 moves to shorter wavelengths, at any selected elemental area receiving the beam, because of the heat that is generated as the beam 24 lands on the variable edge shift filter 18. Thus, at other areas no radiation from the scene 10 can normally pass through both filters 14 and 18. However, when the beam 24 strikes the variable edge shift filter 18, at a selected elemental area the beam will heat the filter 18 enough to shift its optical absorption edge to shorter wavelengths. These shorter wavelengths overlap the wavelengths passed by the fixed filter 14 and permit radiation to pass through both filters in the elemental area being scanned by the electron beam.

The fixed filter 14 may be of the interference or Fabry Perot type. Particular examples of such a filter are filters commercially obtainable from the Infrared Industries Company, and identified as N.B. filters 3.92, 3.93, and 3.72.

The variable filter 18 may be a very thin layer of lead sulphide, lead selenide, or lead telluride, deposited on a transparent support membrane, e.g. on a thin (1/10 mil.) glass sheet. The particular wavelength passed by the filter 14 is controlled by varying the thickness of the layer deposited. The wavelengths passed by the filters 14 and 18 are selected to be closely adjacent to each other when the variable filter is in its normal temperature condition and are chosen to be overlapping substantially when the variable filter 14 is in its heated condition, as caused by the electron beam 24. These two conditions are illustrated by the transmission curves shown in FIG. 2.

A particular example of a variable filter material is lead telluride. Lead telluride has an absorption edge near four microns. The band gap of lead telluride increases by about $4\times10^{-4}$ ev. per degree centigrade temperature rise. This corresponds to a shift of its absorption edge by approximately 100 A. per degree centigrade. Thus, if the scanned filter is allowed to change temperature by 10° C., by means of the electron beam, this produces a shift of about 1000 A. in the absorption edge of the variable filter.

The temperature of a very thin insulating film in thermal equilibrium is determined primarily by radiation considerations. For a thermal emissivity of 0.5, such a thin film would radiate energy at the rate of approximately $\frac{1}{20}$ watt, from each side, per square centimeter of film. A beam of electrons having a current strength of 100 microamperes and landing on the thin film at approximately 1000 volts velocity, would supply the needed $\frac{1}{10}$ watt per square centimeter of film. Alternately a 100 volt beam at a current strength of 1 ma. would supply the required energy to raise the film to 10° C. above ambient. These values of beam current and voltage are easily obtained.

Radiation which passes through both the fixed filter 14 and the variable filter 18 is focussed, by an infra-red lens system 28, onto a photosensitive detector 30. The detector 30 is sensitive to the wavelengths of radiant energy passed by both filters and produces electrical output signals varying with the amount of radiant energy striking it. These output signals are synchronized with the position of the electron beam 24, by suitable conventional circuitry (not shown), to produce an electrical image proportional to the light from the original scene 10. This image may be visibly reproduced on a conventional kinescope or other visible display device by synchronizing the scanning of the electron beam 24 with that of a cathode ray tube (not shown). The signals applied to the cathode ray tube are those obtained from the detector 30.

The detector 30 may be a conventional photoconductive cell such as gold doped germanium, when an infrared sensitive system is used. Both the input and output windows of the envelope 22 are selected to pass the desired wavelengths of radiation. The electron gun 26 is selected to produce a finely focussed beam 24 and may be operated at a potential and current such as that previously indicated.

Figures 3, 4:
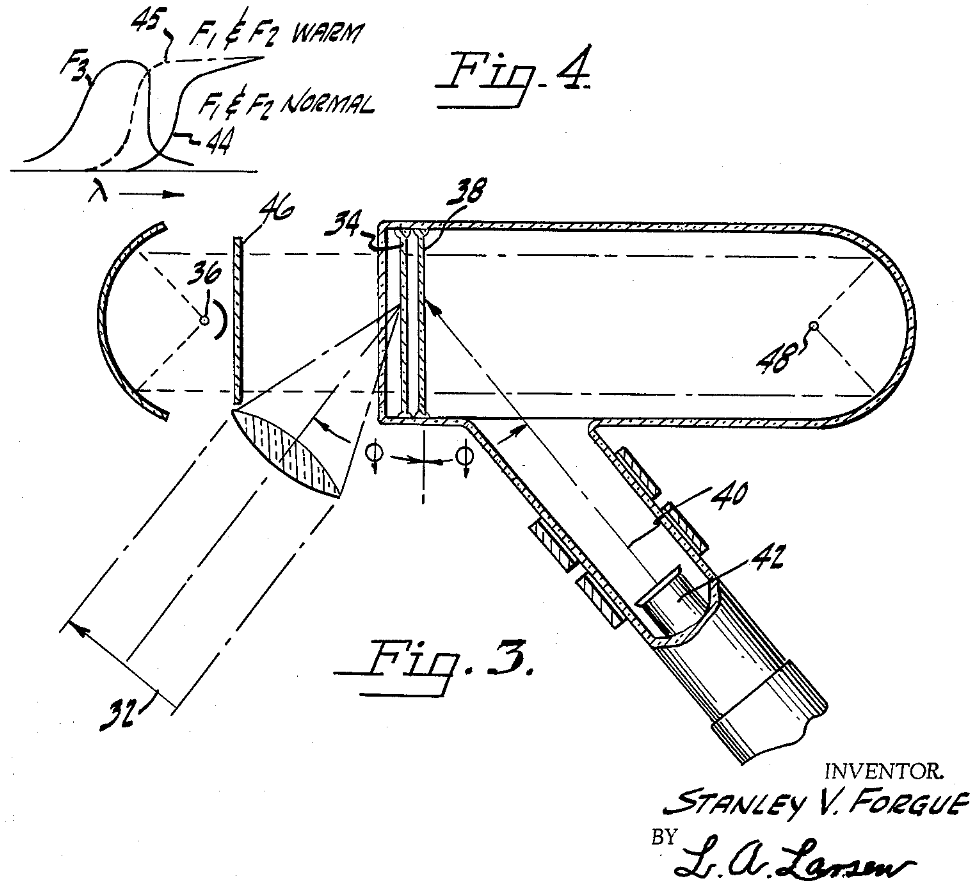
FIG. 3 is a partial schematic sectional view of an imaging device in accordance with this invention; and, FIG. 4 is a characteristic curve of the wavelengths passed by the device shown in FIG. 3.

Referring now to FIG. 3, there is shown an embodiment of this invention having the advantage of light gain. In this embodiment, there is provided a uniform source of infra-red radiations 36. Radiations from the source 36 are directed toward a fixed filter 46. Radiation passing through the fixed filter 46 is directed toward a first positive edge shift variable filter 34, i.e. one in which the band gap increases with temperature, such as for example, lead telluride. Also, there is provided a second positive edge shift variable filter 38. In this embodiment, radiation from an image 32 which is to be reproduced, is focused onto the first positive edge shift variable filter 34. The radiation from the image 32 serves to permit uniform radiation in the pass band of fixed filter 46 from the infra-red source 36, to pass through the variable filter 34 in a spectral range now overlapping the pass band of the fixed filter 46. Radiation from the source 36 will not reach the second variable filter 38 unless the signal information from the scene 32 is directed onto the first variable filter 34.

Radiation passing through the variable filter 34 then lands on the second variable filter 38 which is scanned by an electron beam 40 from an electron gun 42. The combination of the variable filter 34 and the variable filter 38 have a predetermined spectral transmission. This transmission is illustrated, for example, by curve 44 in FIG. 4 when the variable filter 38 is not scanned by the electron beam 40 and when no scene 32 is focussed onto the variable filter 34. At points where infra-red radiant energy from the scene 32 is focussed onto the variable filter 34 and heats it, and the corresponding point of the variable filter 38 is scanned by the electron beam 40, the transmission curve is illustrated by curve 45 in FIG. 4. Any radiation from the source 36 filtered by the fixed filter 46 which passes through both variable filters 34 and 38, i.e. when both are in the excited condition, is directed onto the infra-red detector. Information from the scene therefore controls radiation reaching detector 48. Thus, with an input scene 32 and with the electron beam 40 scanning the variable filter 38, the transmission of the two variable filters is shifted to shorter wavelengths which overlap the spectral characteristic of the fixed filter 46. Thus, only where the scanning beam is instantaneously striking the positive edge shift filter 38 can radiation from the uniform infra-red source 36 penetrate all three filters to actuate the detector cell 48. The image radiation 32 thus controls a "gate" modulating transmission of a much stronger uniform radiation 36 which is picked up by the detector cell 48.

The materials used in the structure illustrated in FIG. 3 may be similar to those previously described in connection with FIG. 1.

It should be noted that in the described embodiments of this invention there is an optical shifting of a filter transmission curve by means of heating. The heating is brought about both by an electron beam and by scene radiation. It should also be noted that the optical transmission curve is shifted so that the curve passes shorter wavelengths of radiant energy when in its excited condition. Thus, this invention obtains a positive modulation wherein any element of the variable filter, e.g. filter 18 in FIG. 1 or 38 in FIG. 3, that is instantaneously under the electron beam, allows radiation to pass through it to reach the detector.

What is claimed is:

1. A radiant energy camera device comprising a photosensitive device, means for positioning at least two filters between an image to be televised and said photosensitive device, the pass band of one of said filters being below the short wavelength limit of the other of said filters, and means for shifting the pass band of said other of said filters to substantially overlap the wave lengths passed by said one of said filters, said last means comprising an electron gun adapted to produce an unmodulated electron beam for uniformly scanning successive elemental areas of said other of said filters, said photosensitive device being positioned to receive radiations from said areas.

2. A radiant energy camera device comprising at least two filters, means for directing radiant energy onto one of said filters, the said one of said filters being adapted to pass a selected band of wavelengths of said radiant energy, the other of said filters being positioned to receive energy passed by said one of said filters, said other of said filters normally passing only a band of wavelengths different from said selected band of wavelengths, means including an unmodulated electron beam for shifting the band of wavelengths passed by said other of said filters to overlap said selected band of wavelengths, whereby radiant energy passes through both of said filters, and photosensitive means in the path of the radiant energy passing through both of said filters.

3. A wavelength selective camera tube system, said system including an electron tube, a filter in said tube, said filter being made of a material having the property of shifting its pass band to shorter wavelengths in response to bombardment by an electron beam, unmodulated electron beam means in said tube adapted to produce said bombardment, and photosensitive pickup means positioned to receive radiations of said shorter wavelengths passed by said filter.

4. A wavelength selective camera tube system including an electron tube, at least one optical filter in said tube, said filter passing a radiant energy of a first band of wavelengths in its unexcited condition and passing a band of shorter wavelengths when said filter is bombarded by an electron beam, means adapted to project an image of said band of shorter wavelengths on said filter, means in said pickup tube for producing an unmodulated electron beam, means for scanning said electron beam over said filter, whereby elemental areas of radiant energy of said band of shorter wavelengths are successively passed by said filter, and means for detecting the radiant energy passed by said filter from said elemental areas thereof when said filter is bombarded by said electron beam.

5. An infra-red sensitive camera device comprising a first filter passing an image formed by a first selected band of wavelengths of radiant energy, a second filter passing only wavelengths of radiant energy beyond the long wavelength limit of said first filter, means for instantaneously shifting the pass band of said second filter to shorter wavelengths to overlap said first selected band of wavelengths, said means including successively heating elemental areas of said second filter whereby radiant energy from successive elemental areas of said second filter are modulated by said image, and means for detecting said modulated radiant energy.

6. Camera system comprising means for projecting an image formed by radiant energy of a predetermined wavelength, a fixed filter adjacent to said projecting means and adapted to pass radiant energy of said predetermined wavelength, a variable filter spaced from a side of said fixed filter remote from said projecting means and normally adapted to pass radiant energy of a different wavelength from said predetermined wavelength, said variable filter being responsive to an electron beam to shift its pass band to overlap said predetermined wavelength, means for scanning said variable filter with an unmodulated electron beam, and detector means spaced from a side of said variable filter remote from said fixed filter, for receiving said signals.

7. A radiant energy camera system comprising a fixed filter which has a predetermined pass band, first and second variable filters each of which normally passes radiant energy only beyond the long wavelength limit of said fixed filter, said first and second variable filters being positioned to receive radiant energy passed by said fixed filter, and different means for selectively shifting the pass band of elemental areas of each of said variable filters towards shorter wavelengths to cause the pass bands of said areas of said first and second filters to overlap each other and said predetermined pass band.

8. A wavelength sensitive camera device comprising a first filter which passes predetermined wavelengths of radiant energy, second and third filters which in their unexcited conditions pass radiant energy only beyond the long wavelength limit of said first filter, said second and third filters being positioned to receive radiant energy passed by said first filter, said second filter being responsive to radiation from an image to be detected to shift its pass band to pass a band of wavelengths overlapping a portion of the wavelengths passed by said first filter, and means including an electron beam for shifting the pass band of said third filter to cause the pass band of said third filter to overlap at least a portion of the wavelengths of radiant energy passed by said first and second filters.

9. A radiant energy camera device comprising at least three filters, means for directing radiant energy onto the first of said filters, the said first of said filters being adapted to pass a selected band of wavelengths of said radiant energy, the second and third of said filters being positioned to receive energy passed by said first of said filters, said second and third of said filters normally passing only a band of wavelengths different from said selected band of wavelengths, said second filter being adapted to shift the band of wavelengths passed by it in response to a light image to overlap said selected band of wavelengths, means including an electron beam for shifting the band of wavelengths passed by the third of said filters to overlap said selected band of wavelengths, whereby intensified radiant energy passes through the third of said filters, and photosensitive means in the path of said intensified energy.

10. A wavelength selective televsion camera system including a scanning tube, two filters in said tube, said filters being made of materials having the property of shifting their pass bands to shorter wavelengths in response to heat, one of said filters being adapted to be heated by means outside of said tube, and electron beam means within said tube for heating the other of said filters.

11. An infrared sensitive camera device comprising a first filter passing a first selected band of wavelengths of radiant energy, second and third filters passing wavelengths of radiant energy only beyond the long wavelength limit of said first filter, said second and third filters being positioned to receive radiant energy passed by said first filter means for instantaneously shifting the pass bands of said second and third filters to shorter wavelengths to overlap said first selected band of wavelengths, said means including heating said second filter in an image pattern and heating said third filter by an electron scanning beam, the heated areas of said image pattern on said second filter and the areas impinged by said beam on said third filter having pass bands overlapping each other and said first selected band of wavelengths, and means for detecting radiant energy passed by said third filter when said second and third filters are heated.

12. A radiant energy camera comprising a fixed filter which has a predetermined pass band, a variable filter which normally passes radiant energy substantially only beyond the long wavelength limit of said fixed filter, said variable filter being positioned to receive radiant energy passed by said fixed filter, and means for selectively shifting the pass band of elemental areas of said variable filter towards shorter wavelengths to cause the pass band of said areas to overlap said predetermined pass band.

13. A radiant energy camera as in claim 12, wherein said means comprises means for scanning an electron beam over the surface of said variable filter.

References Cited by the Examiner

UNITED STATES PATENTS

| | | | |
|---|---|---|---|
| 2,121,990 | 6/38 | Schroter et al. | 313—91 XR |
| 2,563,472 | 8/51 | Leverenz | 88—61 |
| 2,824,235 | 2/58 | Hahn et al. | 88—106 |
| 3,025,763 | 3/62 | Schwartz et al. | 88—106 |

FOREIGN PATENTS

| | | |
|---|---|---|
| 412,905 | 9/32 | Great Britain. |

DAVID G. REDINBAUGH, *Primary Examiner.*

MAYNARD R. WILBUR, *Examiner.*